United States Patent [19]
Gross et al.

[11] Patent Number: 5,576,490
[45] Date of Patent: Nov. 19, 1996

[54] MODULAR ROTARY ELEMENT PROCESSOR

[75] Inventors: Peter L. Gross, Indianapolis; Roy F. Carlson, New Palestine, both of Ind.

[73] Assignee: Illinois Tool Works, Inc., Glenview, Ill.

[21] Appl. No.: 315,895

[22] Filed: Sep. 30, 1994

[51] Int. Cl.$^6$ .................................................. G01M 1/22
[52] U.S. Cl. ............................................. 73/462; 73/471
[58] Field of Search ........................... 73/462, 460, 471, 73/487, 468, 473, 483, 459

[56] References Cited

U.S. PATENT DOCUMENTS

| | | | |
|---|---|---|---|
| 4,023,407 | 5/1977 | Vanderzee | 73/146 |
| 4,060,003 | 11/1977 | Bacsanyi et al. | 73/483 |
| 4,191,055 | 3/1980 | Orem et al. | 73/462 |
| 4,234,200 | 11/1980 | Orem et al. | 73/487 |
| 4,250,756 | 2/1981 | Maus | 73/459 |
| 4,423,632 | 1/1984 | Madden et al. | 73/462 |
| 4,545,247 | 10/1985 | Wilson et al. | 73/473 |
| 4,685,333 | 8/1987 | Wilson et al. | 73/478 |

Primary Examiner—Hezron E. Williams
Assistant Examiner—Helen C. Kwok
Attorney, Agent, or Firm—Barnes & Thornburg

[57] ABSTRACT

A rotary element dynamic imbalance determining apparatus includes a spindle having a first end for removably supporting a rotary element the imbalance of which is to be determined, and a housing for rotatably mounting the spindle. An output signal related to imbalance in the supported rotary element is generated as the spindle rotates. A rotary fluid coupling comprises a chamber between the spindle and housing, a port in the housing for coupling the chamber to a source of compressed air and a one-way fluid seal for dividing the chamber into a first portion and a second portion. A passageway extends along the spindle from the second portion to the first end of the spindle to supply inflating air thereto.

33 Claims, 5 Drawing Sheets

MODULAR ROTARY ELEMENT PROCESSOR

BACKGROUND OF THE INVENTION

1. Field of the Invention

This invention relates to systems for determining dynamic imbalance in rotary elements. It is disclosed in the context of dynamic imbalance determining systems for vehicle wheel and tire assemblies and unmounted vehicle tires. However it is believed to be useful in other applications as well.

2. Description of the Related Art

Various kinds of automated imbalance determining apparatus are known. There are the kinds of apparatus described in, for example, U.S. Pat. No. 4,191,055 and the references cited in that patent.

It is an object of this invention to provide an improved apparatus of that type, particularly one which is adapted to being Constructed in modules. The modules are capable of being combined to provide a system which meets the needs of a particular application, while at the same time preserving the flexibility among the various modules to be combined in different ways and/or with different modules to fulfill the requirements of other applications.

SUMMARY OF THE INVENTION

According to an aspect of the invention, a rotary element dynamic imbalance determining apparatus includes a spindle having a first end for removably supporting a rotary element the imbalance of which is to be determined, a housing for rotatably mounting the spindle, and means for providing an output signal related to imbalance in the supported rotary element as the spindle rotates. Means for rotating the spindle comprises a motor rotor, means for mounting the motor rotor on the spindle, a motor stator, and means for mounting the motor stator on the housing.

According to another aspect of the invention, a rotary element dynamic imbalance determining apparatus includes a spindle, a fluid-operated chuck for engaging a rotary element the imbalance of which is to be determined to grip it and disengaging to release the rotary element, a housing for rotatably mounting the spindle, means for providing an output signal related to imbalance in the supported rotary element as the spindle rotates, means for rotating the spindle, and a rotary fluid coupling for permitting fluid flow to and from the fluid-operated chuck. The rotary fluid coupling comprises a chamber defined between the spindle and the housing, means providing in the housing a first port for coupling the chamber to a source of the chuck-operating fluid, a first one-way fluid seal for dividing the chamber into a first portion and a second portion, and a first fluid passageway extending along the spindle from the first portion of the chamber to the fluid-operated chuck.

According to yet another aspect of the invention, a rotary element dynamic imbalance determining apparatus includes a spindle having a first end for removably supporting a rotary element the imbalance of which is to be determined, a housing for rotatably mounting the spindle, means for providing an output signal related to imbalance in the supported rotary element as the spindle rotates, and means for rotating the spindle. The rotary element comprises a fluid-inflatable rotary element. Means are provided for selectively permitting the flow of an inflating fluid into and out of the fluid-inflatable rotary element selectively to inflate and deflate the fluid-inflatable rotary element. Means provide a rotary fluid coupling for permitting fluid flow to and from the means for selectively permitting the flow of an inflating fluid into and out of the fluid-inflatable rotary element. The rotary fluid coupling comprises means defining a chamber between the spindle and housing, means providing a port in the housing for coupling the chamber to a source of the inflating fluid and a one-way fluid seal for dividing the chamber into a first portion and a second portion. A fluid passageway extends along the spindle from the second portion to the first end of the spindle to supply inflating fluid thereto.

Illustratively according to an embodiment of the invention, the rotary element comprises means defining a mounting hole and the means for removably supporting the rotary element on the first end of the spindle comprises a fluid-operated chuck for engaging to grip the rotary element removably and disengaging to release the rotary element.

Illustratively, the fluid-operated chuck comprises a pneumatic chuck.

Further illustratively according to an embodiment of the invention, a rotary fluid coupling permits fluid flow to and from the fluid-operated chuck.

Additionally illustratively according to an embodiment of the invention, the means for providing a rotary fluid coupling comprises means defining between the spindle and the housing a chamber, means providing a first port in the housing for coupling the chamber to a source of chuck-operating fluid, a first one-way fluid seal for dividing the chamber into a first portion and a second portion, and a first fluid passageway extending along the spindle from the first portion to the fluid-operated chuck.

Illustratively according to an embodiment of the invention, a servo motor controller is provided along with means for selectively coupling the servo motor controller to at least one of the motor rotor and motor stator to control the motor.

Additionally illustratively according to an embodiment of the invention, the means for selectively coupling the servo motor controller to at least one of the motor rotor and motor stator comprises means for effectively disabling the servo motor controller during a rotary element dynamic imbalance determining interval.

Further illustratively according to an embodiment of the invention, the motor rotor and stator together comprise a brushless direct current motor.

BRIEF DESCRIPTION OF THE DRAWINGS

The invention may best be understood by referring to the following description and accompanying drawings which illustrate the invention. In the drawings.

DETAILED DESCRIPTIONS OF ILLUSTRATIVE EMBODIMENTS

Figure 1:
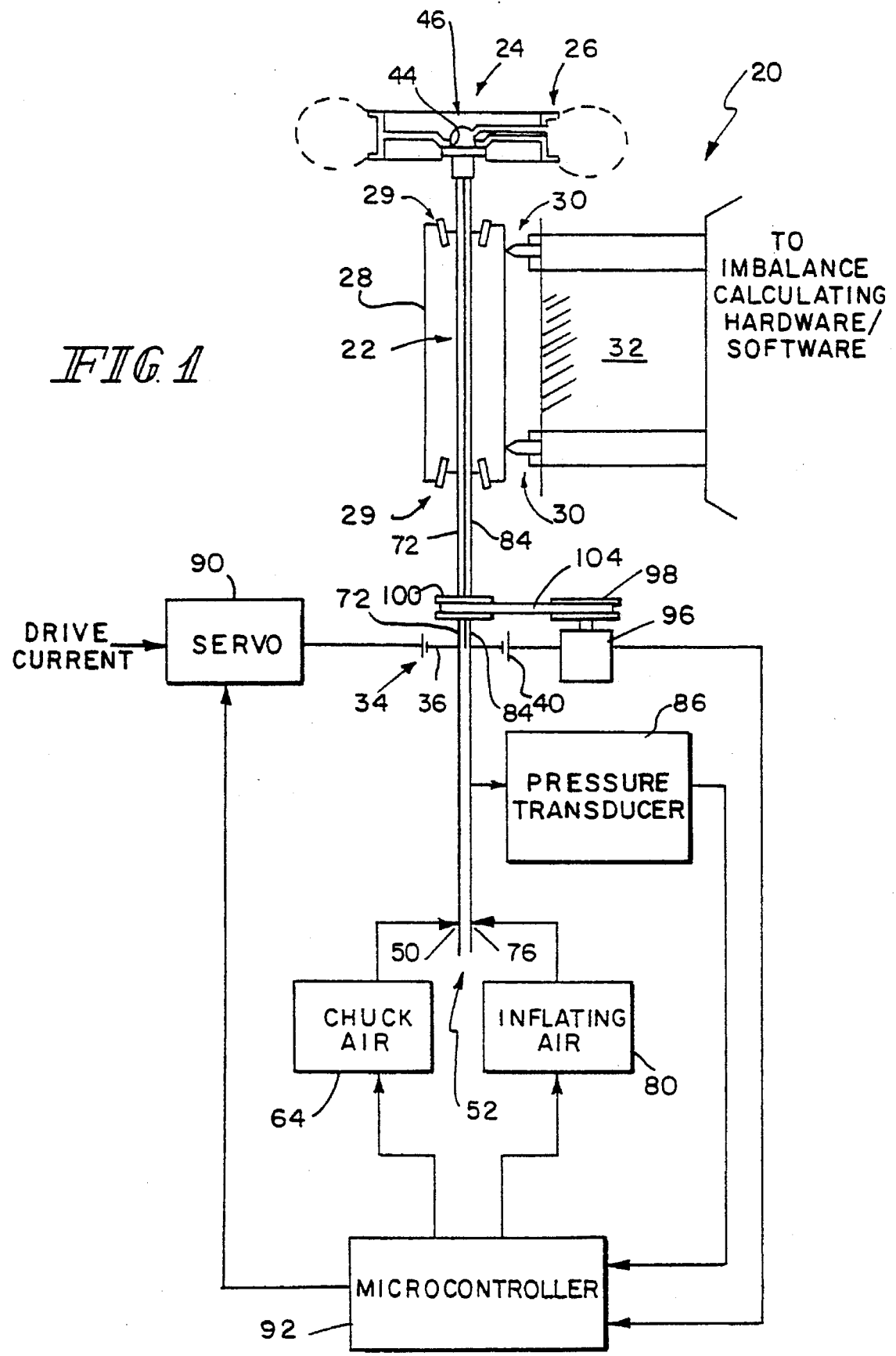
FIG. 1 illustrates, in partly block and diagrammatic form, a system constructed according to the invention.
Figure 2:
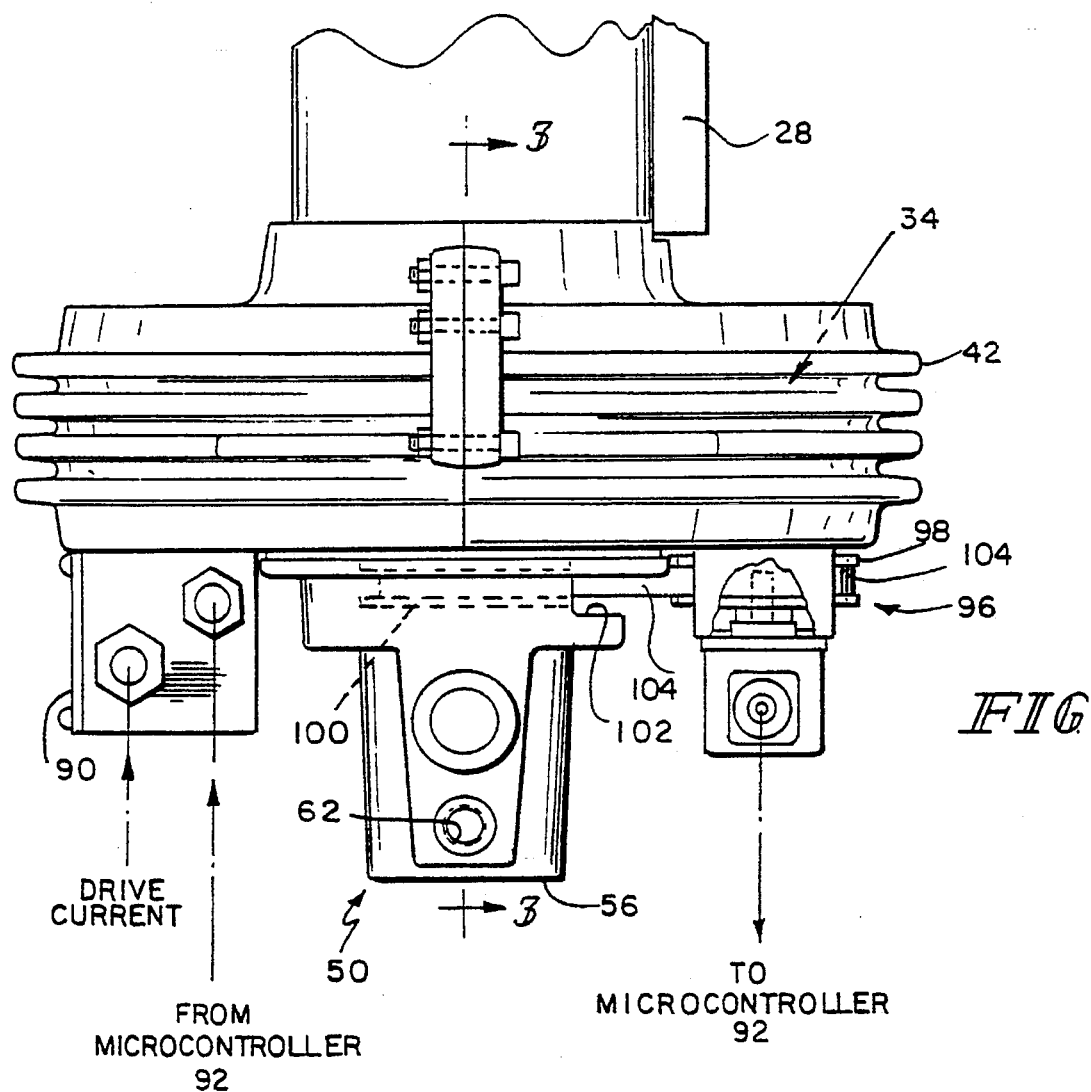
FIG. 2 illustrates a fragmentary side elevational view of a system constructed according to the invention.
Figure 3:
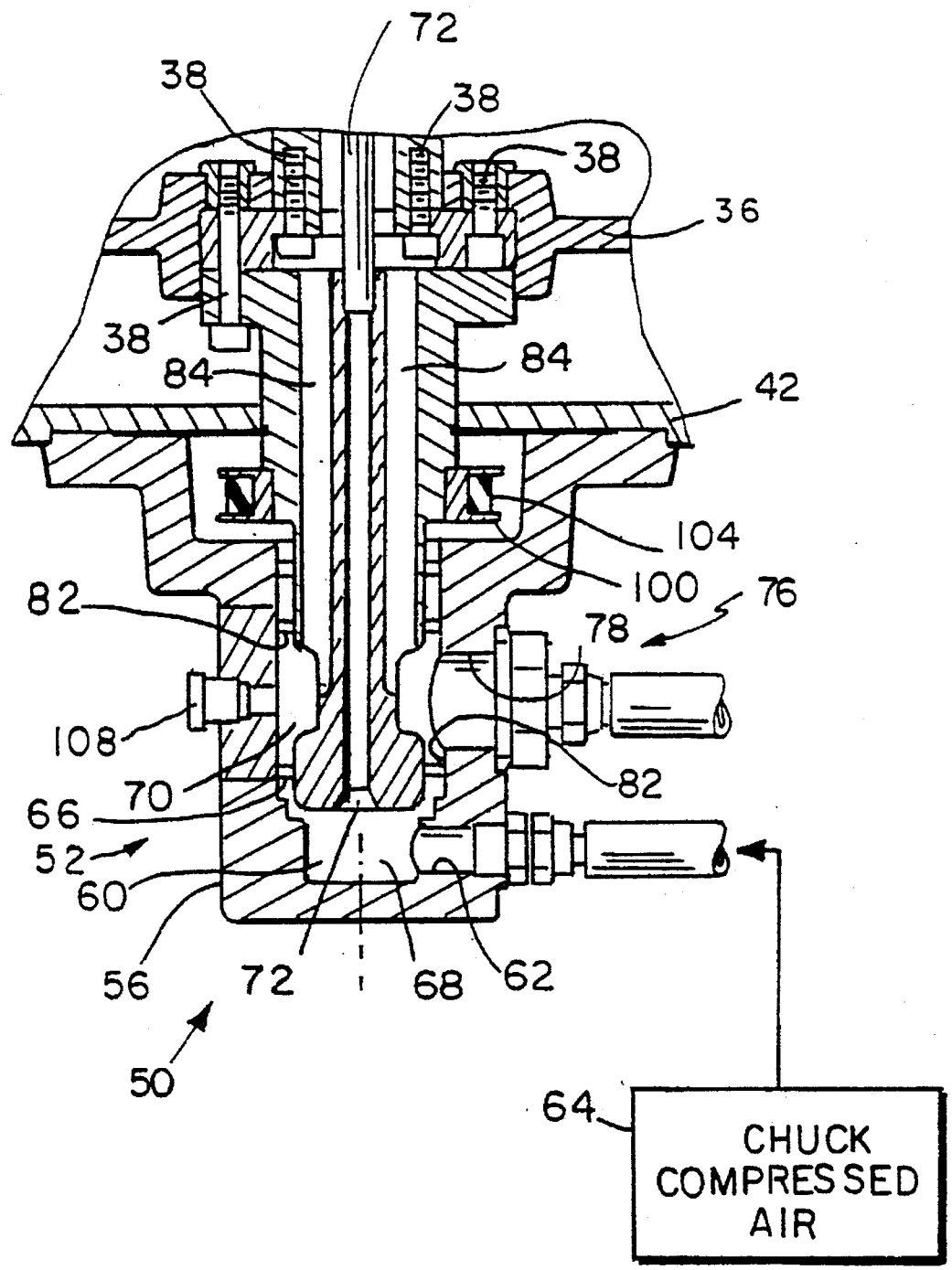
FIG. 3 illustrates a primarily fragmentary sectional view, taken generally along section lines 3—3, of FIG. 2.

Referring now to FIGS. 1–3, a rotary element dynamic imbalance determining apparatus 20 includes a spindle 22 of the general type described in U.S. Pat. No. 4,191,055 having a first end 24 for removably supporting a rotary element 26 the imbalance of which is to be determined. Illustratively, the rotary element is a vehicle wheel-and-tire assembly. A spindle housing 28 rotatably mounts the spindle 22 in bearings 29. Load cells 30 positioned between the spindle housing 28 and the frame 32 of apparatus 20 provide output signals related to imbalance in the supported rotary element 26 as the spindle 22 rotates. The spindle 22 is rotated by a motor 34 including a rotor 36 mounted by bolts 38 on the spindle 22, a motor stator 40, and a housing 42 for mounting the motor stator 40 to the spindle housing 28. The motor rotor 36 and stator 40 together comprise a brushless direct current motor 34.

The rotary element 26 includes a center hole 44. A pneumatically operated chuck 46 is mounted on the first end 24 of spindle 22 for engaging the center hole 44 to grip the rotary element 26, and disengaging the center hole 44 to release the rotary element 26. A rotary fluid coupling 50 at a second end 52 of spindle 22 permits air flow to and from the pneumatically-operated chuck 46. The rotary fluid coupling 50 comprises a somewhat cup-shaped member 56 for attachment to the housing 42 for defining between the second end 52 of the spindle 22 and the member 56 a chamber 60. A first port 62 is provided in the member 56 for coupling the chamber 60 to a source 64 of chuck-operating air. A first one-way fluid seal 66 divides the chamber 60 into a first portion 68 and a second portion 70. A first fluid passageway 72 extends along the spindle 22 from the first portion 68 of the chamber 60 to the pneumatically-operated chuck 46.

Figure 4:
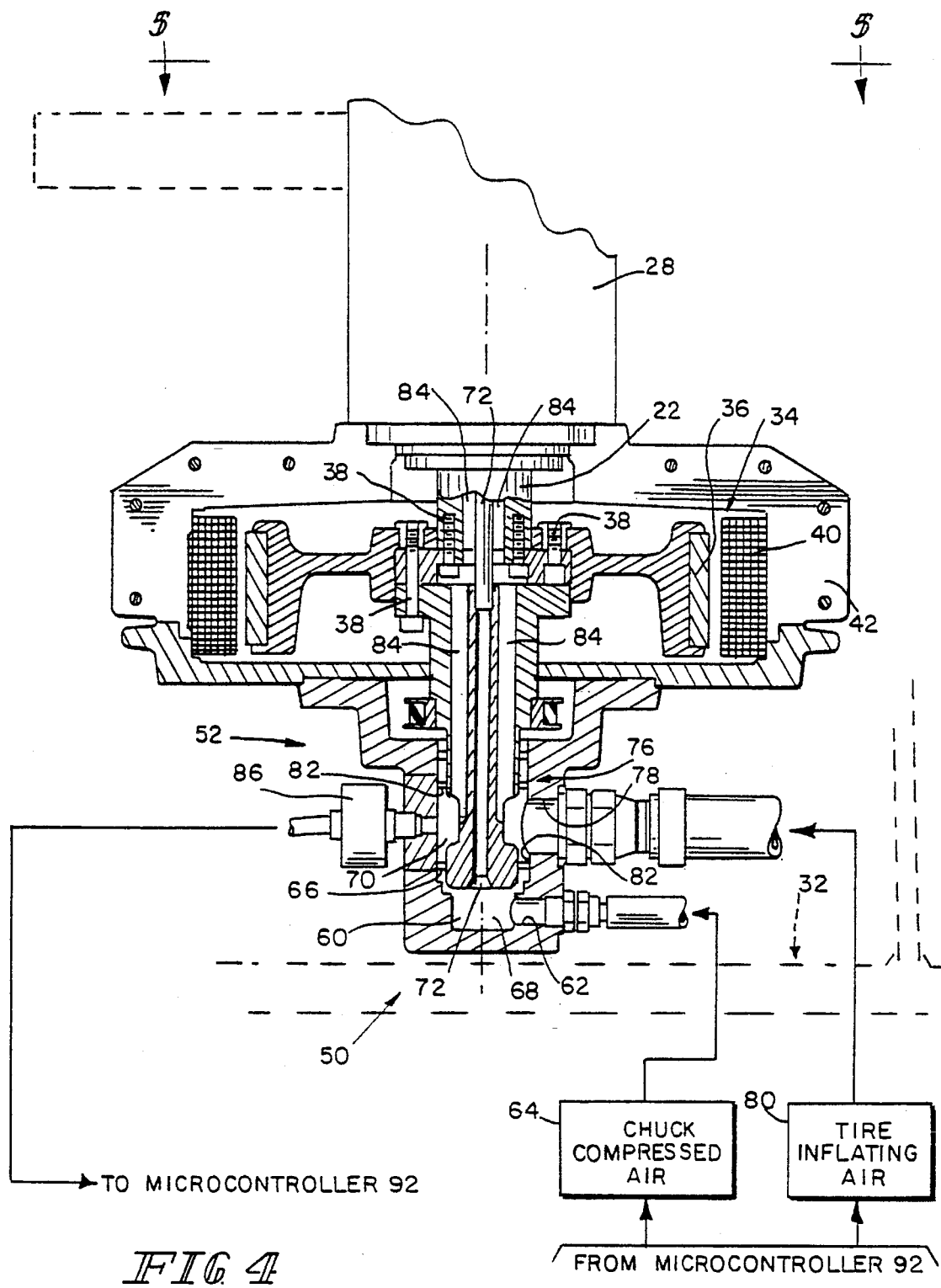
FIG. 4 illustrates a primarily fragmentary side elevational view of another system constructed according to the invention.
Figure 5:
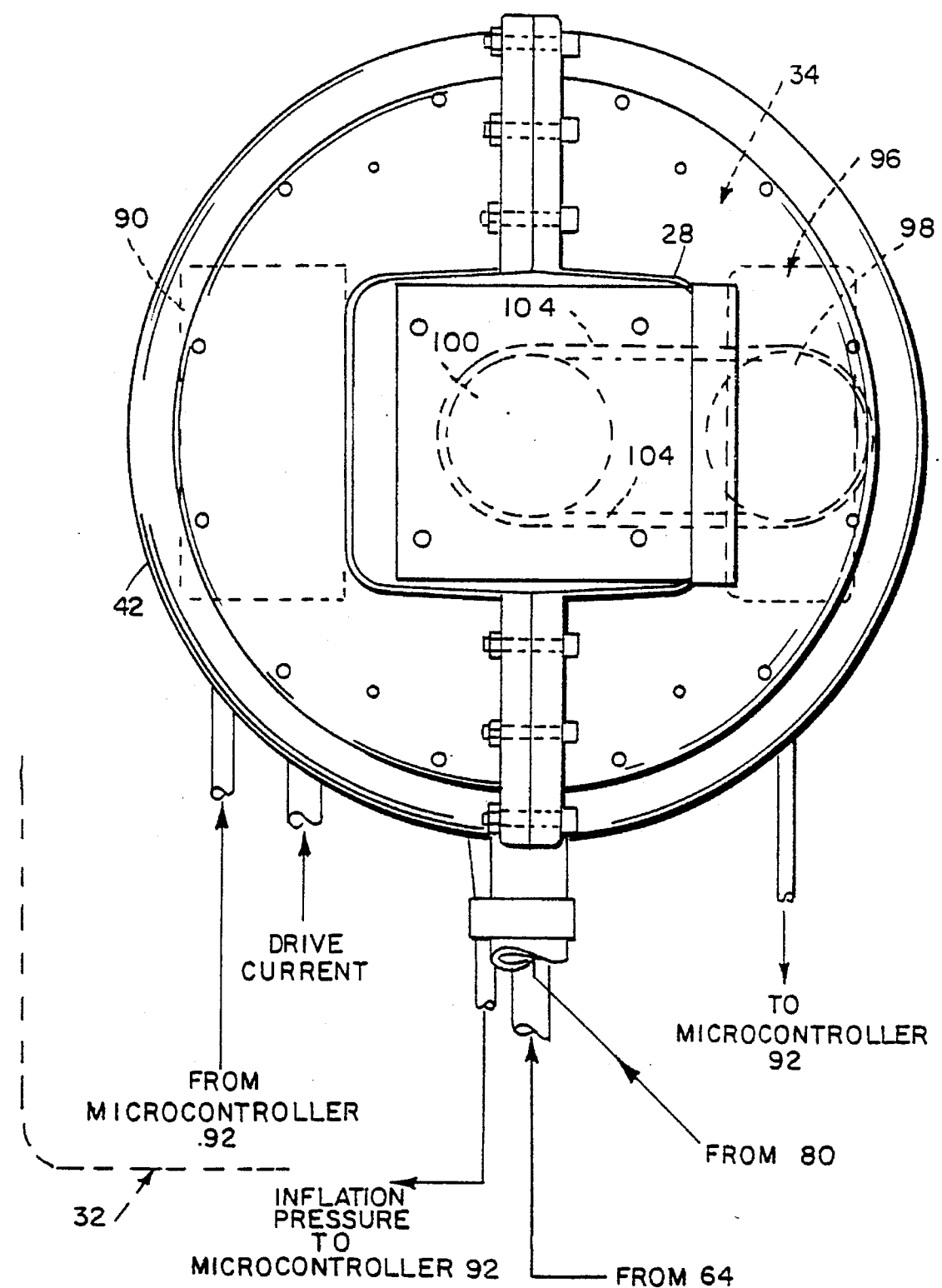
FIG. 5 illustrates a fragmentary top plan view, taken generally along section lines 5—5, of FIG. 4.

In another embodiment of the invention illustrated in FIGS. 1 and 4–5, the rotary element 26 is an unmounted vehicle tire. The first end of the spindle includes unmounted tire mounting and inflating tooling. The spindle 22 also comprises a rotary air coupling 76 for permitting compressed air flow to and from the spindle 22. The coupling 76 includes a second port 78 in the member 56 for coupling the chamber 60 to a source 80 of the compressed air and second one-way fluid seals 82 for dividing the chamber 60 into the first portion 68 and second portion 70. Second air passageways 84 extend along the spindle 22 from the second portion 70 of the chamber 60 to the first end 24 of the spindle 22 to supply rotary element-inflating compressed air thereto. A pressure transducer 86 in second portion 70 of chamber 60 feeds back inflating air pressure.

A servo motor controller 90 is selectively coupled by a microcontroller 92 to the motor stator 40 to control the motor 34. The microcontroller 92 effectively disables the servo motor controller 90 during a rotary element dynamic imbalance determining interval to prevent servo control loop jitter from affecting the imbalance determination. The servo control loop is closed by a position encoder 96 mounted on the outside of housing 42. Position encoder 96 has an input shaft which carries a driven pulley 98. A driving pulley 100 is mounted adjacent the end 52 of spindle 22 at the junction of housing 42 and member 56. A slot-like opening 102 is provided between housing 42 and member 56 for passage of a toothed timing belt 104 which is trained about both of pulleys 98, 100 to provide the necessary rotation frequency information to encoder 96 and thus to servo motor controller 90.

The same motor 34, housing 42 and member 56 are used in both of the illustrated embodiments. In the embodiment of FIGS. 2–3, the transducer 86 port is plugged 108 since the transducer 86 is not employed in that embodiment.

What is claimed is:

1. In a rotary element dynamic imbalance determining apparatus including a spindle having a first end including means for removably supporting a rotary element, the imbalance of which is to be determined, a housing for rotatably mounting the spindle, and means for providing an output signal related to imbalance in the supported rotary element as the spindle rotates, a motor, the motor having a rotatable motor rotor and a stationary motor stator, means for rotating the spindle, the spindle rotating means comprising the motor rotor, means for mounting the motor rotor on the spindle, means for mounting the motor stator on the housing, the rotary element comprising a mounting hole and the means for removably supporting the rotary element on the first end of the spindle comprising a fluid-operated chuck for engaging the mounting hole to grip the rotary element removably and for disengaging from the mounting hole to release the rotary element, and means for providing on the spindle a rotary fluid coupling for permitting fluid flow to and from the fluid-operated chuck.

2. The apparatus of claim 1 wherein the fluid-operated chuck comprises a pneumatic chuck.

3. The apparatus of claim 1 wherein the means for providing a rotary fluid coupling comprises means for defining between the spindle and the housing a chamber, means for providing a first port in the housing for coupling the chamber to a source of chuck-operating fluid, a first one-way fluid seal for dividing the chamber into a first portion and a second portion, and a first fluid passageway extending along the spindle from the first portion to the fluid-operated chuck.

4. The apparatus of claim 1 wherein the rotary element comprises a fluid-inflatable rotary element and the spindle comprises means for selectively permitting a flow of an inflating fluid into the fluid-inflatable rotary element and out of the fluid-inflatable rotary element selectively to inflate and deflate, respectively, the fluid-inflatable rotary element.

5. The apparatus of claim 4 further comprising means for providing on the spindle a rotary fluid coupling for permitting inflating fluid flow to and from the means for selectively permitting the flow of an inflating fluid into and out of the fluid-inflatable rotary element.

6. The apparatus of claim 4 or 5 wherein the means for selectively permitting the flow of an inflating fluid into and out of the fluid-inflatable rotary element comprises means for defining a chamber, means for providing a second port in the housing for coupling the chamber to a source of the inflating fluid and a second one-way fluid seal for dividing the chamber into a first portion and a second portion, and a second fluid passageway extending along the spindle from the second portion of the chamber to the first end of the spindle to supply rotary element-inflating fluid thereto.

7. The apparatus of claim 1, 2, 3, 4 or 5 and further comprising a servo motor controller and means for selectively coupling the servo motor controller to at least one of the motor rotor and motor stator to control the motor.

8. The apparatus of claim 7 wherein the means for selectively coupling the servo motor controller to at least one of the motor rotor and motor stator comprises means for effectively disabling the servo motor controller during a rotary element dynamic imbalance determining interval.

9. The apparatus of claim 8 wherein the motor rotor and motor stator together comprise a brushless direct current motor.

10. The apparatus of claim 6 and further comprising a servo motor controller and means for selectively coupling the servo motor controller to at least one of the motor rotor and motor stator to control the motor.

11. The apparatus of claim 10 wherein the means for selectively coupling the servo motor controller to at least one of the motor rotor and motor stator comprises means for effectively disabling the servo motor controller during a rotary element dynamic imbalance determining interval.

12. The apparatus of claim 11 wherein the motor rotor and motor stator together comprise a brushless direct current motor.

13. In a rotary element dynamic imbalance determining apparatus including a spindle, a fluid-operated chuck for engaging a rotary element, the imbalance of which is to be determined to grip the rotary element and disengaging to release the rotary element, a housing for rotatably mounting the spindle, means for providing an output signal related to imbalance in the rotary element as the spindle rotates, means for rotating the spindle, and a rotary fluid coupling for permitting fluid flow to and from the fluid-operated chuck, the rotary fluid coupling comprising a chamber defined between the spindle and the housing, means for providing in the housing a first port for coupling the chamber to a source of the chuck-operating fluid, a first one-way fluid seal for dividing the chamber into a first portion and a second portion, and a first fluid passageway extending along the spindle from the first portion of the chamber to the fluid-operated chuck.

14. The apparatus of claim 13 wherein the rotary element comprises a fluid-inflatable rotary element, and further comprising means for selectively permitting a flow of an inflating fluid into the fluid-inflatable rotary element and out of the fluid-inflatable rotary element selectively to inflate and deflate the fluid-inflatable rotary element.

15. The apparatus of claim 14 further comprising a rotary fluid coupling for permitting fluid flow to and from the means for selectively permitting the flow of an inflating fluid into and out of the fluid-inflatable rotary element.

16. The apparatus of claim 13, 14 or 15 and further comprising a servo motor controller and means for selectively coupling the servo motor controller to at least one of the motor rotor and motor stator to control the motor.

17. The apparatus of claim 16 wherein the means for selectively coupling the servo motor controller to at least one of the motor rotor and motor stator comprises means for effectively disabling the servo motor controller during a rotary element dynamic imbalance determining interval.

18. The apparatus of claim 17 wherein the means for rotating the spindle comprises a brushless direct current motor.

19. The apparatus of claim 14 or 15 wherein the means for selectively permitting the flow of an inflating fluid into and out of the fluid-inflatable rotary element comprises means for providing in the housing a second port for coupling the chamber to a source of the inflating fluid and a second one-way fluid seal for cooperating with the first one-way fluid seal to divide the chamber into said first portion and said second portion, and a second fluid passageway extending along the spindle from the second portion of the chamber to supply the inflating fluid to the fluid-inflatable rotary element engaged by the fluid-operated chuck.

20. The apparatus of claim 19 wherein the means for rotating the spindle comprises a motor rotor, means for mounting the motor rotor to the spindle, a motor stator, and means for mounting the motor stator to the housing.

21. The apparatus of claim 20 and further comprising a servo motor controller and means for selectively coupling the servo motor controller to at least one of the motor rotor and motor stator to control the motor.

22. The apparatus of claim 21 wherein the means for selectively coupling the servo motor controller to at least one of the motor rotor and motor stator comprises means for effectively disabling the servo motor controller during a rotary element dynamic imbalance determining interval.

23. In a rotary element dynamic imbalance determining apparatus including a spindle having a first end including means for removably supporting a rotary element, the imbalance of which is to be determined, a housing for rotatably mounting the spindle, means for providing an output signal related to imbalance in the supported rotary element as the spindle rotates, means for rotating the spindle, the rotary element comprising a fluid-inflatable rotary element, means for selectively permitting a flow of an inflating fluid into and out of the fluid-inflatable rotary element selectively to inflate and deflate the fluid-inflatable rotary element, means for providing a first rotary fluid coupling for permitting fluid flow to and from the means for selectively permitting the flow of an inflating fluid into and out of the fluid-inflatable rotary element, the means for removably supporting the rotary element comprising a fluid-operated chuck for engaging the rotary element to grip the rotary element and for disengaging the rotary element to release the rotary element, and means for providing a second rotary fluid coupling for permitting fluid flow to and from the fluid-operated chuck, the first rotary fluid coupling comprising means for defining a chamber between the spindle and the housing, means for providing a port in the housing for coupling the chamber to a source of the inflating fluid and a first one-way fluid seal for dividing the chamber into a first portion and a second portion, and a first fluid passageway extending along the spindle from the second portion to the first end of the spindle to supply the inflating fluid thereto.

24. The apparatus of claim 23 wherein the means for providing a second rotary fluid coupling comprises a second one-way fluid seal for cooperating with the first one-way fluid seal for dividing the chamber into said first portion and said second portion, and a second fluid passageway extending along the spindle from said first portion of the chamber to the fluid-operated chuck.

25. The apparatus of claim 23 wherein the means for rotating the spindle comprises a motor rotor, means for mounting the motor rotor on the spindle, a motor stator, and means for mounting the motor stator on the housing.

26. The apparatus of claim 25 and further comprising a servo motor controller and means for selectively coupling the servo motor controller to at least one of the motor rotor and motor stator to control the motor.

27. The apparatus of claim 26 wherein the means for selectively coupling the servo motor controller to at least one of the motor rotor and motor stator comprises means for effectively disabling the servo motor controller during a rotary element dynamic imbalance determining interval.

28. The apparatus of claim 23 wherein the means for rotating the spindle comprises a motor rotor, means for mounting the motor rotor on the spindle, a motor stator, and means for mounting the motor stator on the housing.

29. The apparatus of claim 28 and further comprising a servo motor controller and means for selectively coupling the servo motor controller to at least one of the motor rotor and motor stator to control the motor.

30. The apparatus of claim 29 wherein the means for selectively coupling the servo motor controller to at least one of the motor rotor and motor stator comprises means for effectively disabling the servo motor controller during a rotary element dynamic imbalance determining interval.

31. The apparatus of claim 24 wherein the means for rotating the spindle comprises a motor rotor, means for mounting the motor rotor on the spindle, a motor stator, and means for mounting the motor stator on the housing.

32. The apparatus of claim 31 and further comprising a servo motor controller and means for selectively coupling the servo motor controller to at least one of the motor rotor and motor stator to control the motor.

33. The apparatus of claim 32 wherein the means for selectively coupling the servo motor controller to at least one of the motor rotor and motor stator comprises means for effectively disabling the servo motor controller during a rotary element dynamic imbalance determining interval.

* * * * *